United States Patent [19]

Carman

[11] 4,098,083
[45] Jul. 4, 1978

[54] HYDRAULIC ENERGY STORAGE MULTI-SPEED TRANSMISSION

[76] Inventor: Vincent E. Carman, 10728 NE. Halsey D-34, Portland, Oreg. 97220

[21] Appl. No.: 789,197

[22] Filed: Apr. 20, 1977

[51] Int. Cl.² .............................................. F15B 1/02
[52] U.S. Cl. ........................................ 60/414; 60/483; 60/484; 180/66 R
[58] Field of Search ................. 60/408, 413, 414, 483, 60/484, 486; 180/66 R

[56] References Cited

U.S. PATENT DOCUMENTS

| | | | |
|---|---|---|---|
| 575,681 | 1/1897 | Clark | 180/66 R |
| 1,229,076 | 6/1917 | Hayes | 60/408 |
| 2,628,476 | 2/1953 | Grier | 60/413 X |
| 2,641,106 | 6/1953 | Jelinek | 60/371 X |
| 2,755,898 | 7/1956 | Bell | 60/414 X |
| 3,903,696 | 9/1975 | Carman | 60/414 |

*Primary Examiner*—Edgar W. Geoghegan
*Attorney, Agent, or Firm*—Chernoff & Vilhauer

[57] ABSTRACT

A hydraulic multi-speed, multi-torque transmission system for vehicles for storing and converting energy resulting from braking of the vehicle, such transmission utilizing multiple fixed displacement hydraulic pump-motors coupled to the vehicle wheels and a fixed displacement pump driven by the engine.

8 Claims, 1 Drawing Figure

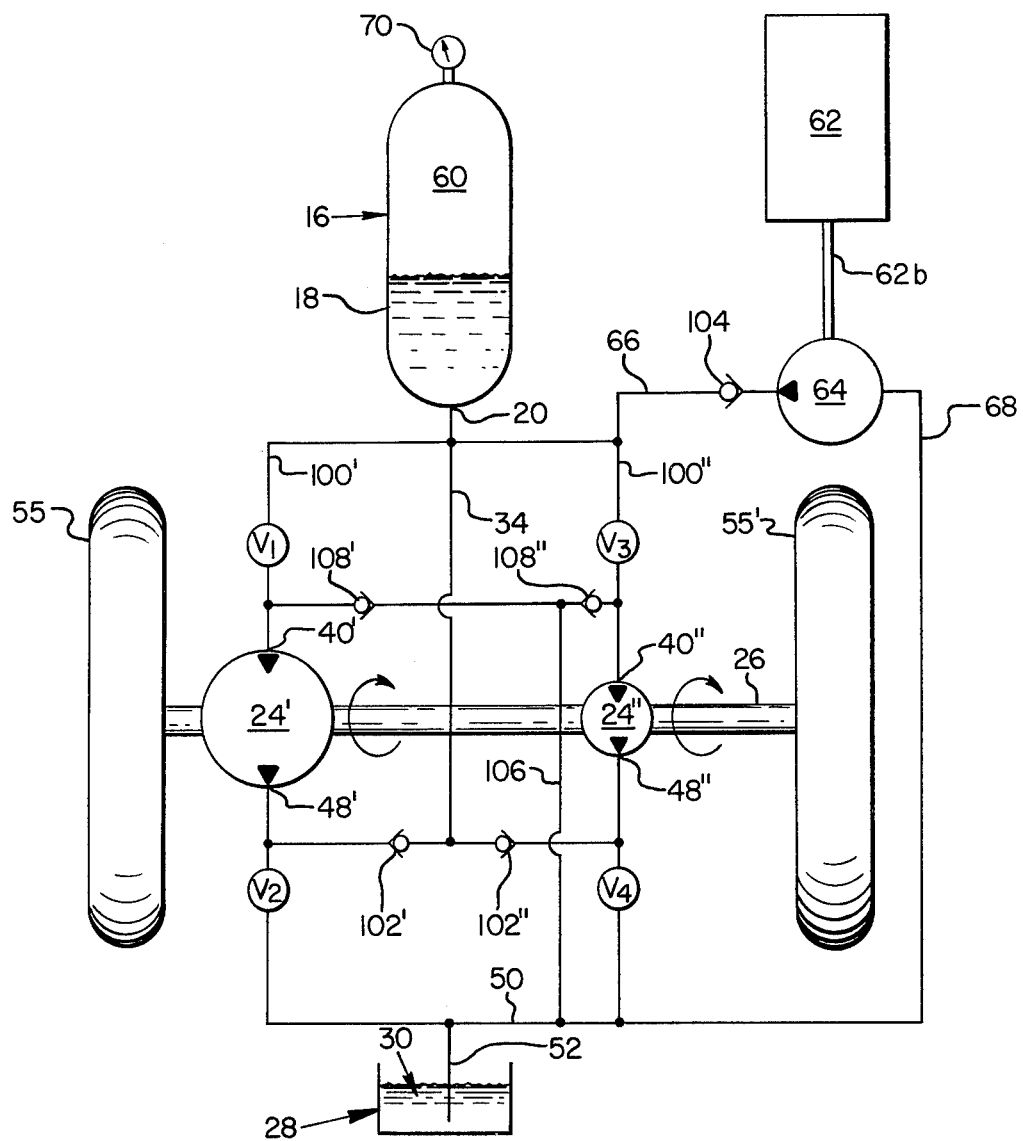

HYDRAULIC ENERGY STORAGE MULTI-SPEED TRANSMISSION

BACKGROUND OF THE INVENTION

The present invention relates to an improvement in the invention described in my U.S. Pat. No. 3,903,696 entitled "Hydraulic Energy Storage Transmission," issued Sept. 9, 1975. The disclosure of such patent is incorporated herein in its entirety by this reference.

A major problem which is presented with systems which store braking energy and convert it to drive power by hydraulic principles is that such systems require a hydraulic transmission comprising one or more hydraulic motors to be driven by the output from the brake energy accumulator and an engine-driven pump. For vehicular use such hydraulic transmission must of necessity be multi-speed and multi-torque in character, i.e., it must have a selectively variable ratio of output shaft speed and torque with respect to the speed and torque of the engine.

Such multi-speed and torque capability is conventionally accomplished with hydraulic transmissions by the utilization of variable displacement pumps and/or motors in the transmissions. A problem however arises from the fact that such variable displacement pump and motor equipment is customarily of very low efficiency due to the swash plate, wobble plate or other type of mechanical volumetric variation apparatus utilized within the equipment.

SUMMARY OF THE PRESENT INVENTION

I have discovered that the low efficiency of variable displacement hydraulic transmission pumps and motors can be of such magnitude as to offset significantly the energy saving advantages of a hydraulic brake energy storage and conversion system such as that shown in my aforesaid patent.

Accordingly it is a primary objective of the present invention to utilize in such a hydraulic brake energy storage and conversion system a hydraulic transmission of the type having multi-speed and multi-torque capability and utilizing only fixed displacement pump and motor equipment rather than variable displacement equipment, in order to eliminate the high inefficiency which is characteristic of such variable displacement equipment and thereby maximize the effectiveness of the brake energy storage and conversion system.

It is a further objective of the present invention to achieve the foregoing result by the mechanical coupling of multiple fixed displacement hydraulic motors to the wheels of a vehicle and the concomitant hydraulic connection of such motors to an engine-driven fixed displacement pump with valving interposed between the pump and the motors for selectively directing flow of hydraulic fluid under pressure to one or more of the motors, depending upon the speed and torque parameters of operation.

It is a further objective of the present invention that such multiple fixed displacement hydraulic motors are provided with different torque outputs and volumetric capacities under the same hydraulic input pressure conditions, so as to provide for a number of different speed and torque ratios greater than the number of fixed displacement motors utilized.

It is a further objective of the present invention to utilize such multiple fixed displacement hydraulic motors selectively also as pumps to brake the vehicle by receiving energy from the wheels during braking and hydraulically converting and storing such energy for later use.

The foregoing and other objectives, features and advantages of the present invention will be more readily understood upon consideration of the following detailed description of the invention taken in conjunction with the accompanying drawing.

BRIEF DESCRIPTION OF THE DRAWING

The single FIGURE is a schematic diagram of an illustrative embodiment of the hydraulic energy storage and conversion transmission system of the present invention.

DETAILED DESCRIPTION OF THE INVENTION

The illustrative embodiment of the invention shown in the single FIGURE is in a number of respects identical to that shown in my U.S. Pat. No. 3,903,696, incorporated herein by reference. Identical numbers are used herein to indicate the same parts with the same functions as described in said patent, with the exceptions noted below, and will therefore not be duplicated in detail here, the reader being directed to said patent for a fuller explanation.

To summarize the elements of the system, an engine or prime mover 62 drives a fixed displacement pump 64 which receives hydraulic fluid 30 from a reservoir 28 through line 68 and discharges the fluid under pressure into line 66. The pressurized fluid flows selectively to fixed displacement pump-motors 24' and 24", such motors being mechanically coupled to the wheels 55 and 55' through wheel drive shaft 26. In the driving mode, operator-controlled valves $V_1$ and $V_3$ selectively regulate the flow of pressurized fluid to the pump-motors to control the motion of the vehicle. Return flow of the fluid from the pump-motors to the reservoir is through normally open valves $V_2$ and $V_4$ and the line 52.

Reverse motion can be accomplished through any conventional gearbox (not shown) mechanically coupling the drive pump-motors 24' and 24" to the wheels or, alternatively, by utilizing bi-directional fixed displacement pump-motors and appropriate associated reversing circuitry, for example of the general type shown in my copending U.S. patent application Ser. No. 765,951, filed Feb. 7, 1977, incorporated herein by this reference. Moreover the fixed displacement pump 64 could alternatively be a pump-motor for starting the engine 62 with associated circuitry and controls of the type shown in my aforesaid copending patent application.

In response to the application of the vehicle brakes, one or both of valves $V_2$ and $V_4$ close, causing one or both of the pump-motors 24' and 24" to be driven as pumps by the wheels 55, 55' and shaft 26 so as to help brake the vehicle. In the braking mode, the pump-motors deliver pressurized fluid through line 34 to the accumulator 16 through port 20, causing fluid under pressure to enter the accumulator in which a compressible gas designated by the numeral 60 is captivated. The gas, under the influence of this increasing pressure is compressed and, subsequently, when either or both of the valves $V_1$ and $V_3$ are opened in the driving mode, for example in response to operation of a foot throttle, and the corresponding valves $V_2$ and $V_4$ are open, the gas forces the hydraulic fluid in the accumulator to flow from port 20 to the pump-motors alone or in conjunction with fluid from the pump 64 to accelerate or otherwise propel the vehicle. Conversely, when the control valves $V_1$ and $V_3$ are closed, hydraulic fluid from the pump 64 is directed into the accumulator 16 and the energy is stored therein, together with any braking energy supplied from the pump-motors 24' and 24", for later use in helping to accelerate or otherwise propel the vehicle.

The major differences, between the FIGURE herein and that of the referenced U.S. Pat. No. 3,903,696, involves the pump-motors 24' and 24" and the control valving and associated hydraulic circuitry therefor. Rather than a single drive motor, the present invention utiizes multiple fixed displacement drive pump-motors 24' and 24" both mechanically coupled to the wheel drive shaft 26 so as to deliver torque to the shaft or, alternatively, receive torque from the shaft 26. Pump-motor 24' is of a higher volumetric capacity per revolution and has a higher torque output for any given hydraulic input pressure than does the smaller pump-motor 24". For illustrative purposes it will be assumed that pump-motor 24' has twice the volumetric capacity and torque output as does pump-motor 24".

In the driving mode, the inputs 40' and 40" of the two pump-motors respectively are selectively connected with the pressurized output of the pump 64 and accumulator 16 through respective lines 100' and 100" and valves $V_1$ and $V_3$, while the outputs 48' and 48" of the drive pump-motors are connected through open valves $V_2$ and $V_4$ respectively to the line 50 leading to the input line 68 of the pump 64 and to the reservoir 28.

Alternatively, when either of valves $V_2$ and $V_4$ are closed in response to the braking of the vehicle, fluid under pressure from the respective pump-motor outlet 48' or 48" is directed to the accumulator 16 through a respective check valve 102' or 102" and line 34. The check valves 102' and 102" prevent cross-feed between the outputs of the two pump-motors 24' and 24" in case only one of the pump-motors is being used for braking, for reasons to be described hereafter, and also prevent short-circuiting of the pump-motors in the driving mode by the high-pressure fluid from the pump 64 and accumulator 16. A check valve 104 in the output line 66 of the engine-driven pump 64 prevents excessive back pressure against the pump 64 in the braking mode.

During the braking mode, the respective valves $V_1$ and $V_3$ are both closed in response to the deactivation of the vehicle accelerator, and the respective pump-motors 24' and/or 24" draw their input fluid from reservoir line 106 through a respective check valve 108' or 108". The check valves 108' and 108" prevent short-circuiting of the pump-motors when in the driving mode.

Valves $V_1$ and $V_3$, the positions of which may be manually controlled but are preferably automatically responsive to an operating parameter of the vehicle such as drive torque or the pressure of hydraulic fluid supplied to the drive motors, are capable of selectively varying the speed and torque ratios between the wheel drive shaft 26 and engine drive shaft 62b. In the embodiment illustrated in the FIGURE, when the valves $V_1$ and $V_3$ are both open (valves $V_2$ and $V_4$ also being open since the brake is not applied), hydraulic fluid under pressure is directed to the inputs 40' and 40" of both pump-motors simultaneously. This results in the delivery of maximum torque to the wheels 55 and 55' through the shaft 26, and provides the lowest speed ratio of the wheels to the engine drive shaft 62b. Such valve positions would be used, for example, in accelerating the vehicle initially from a standing start.

If the valve $V_3$ is closed, leaving the valve $V_1$ open, only the higher-torque, higher-volume motor 24' receives pressurized fluid, the smaller motor 24" being permitted to recirculate fluid drawn through line 106. In these positions of the valves $V_1$ and $V_3$, assuming for simplicity the same engine speed and engine torque output as in the first case where both valves were open, and neglecting the effect of the pressure in the accumulator 16, the torque delivered to the wheels 55 and 55' would be only two-thirds of that delivered in the first case, but the speed ratio of the wheels to the engine drive shaft 62b would be $1\frac{1}{2}$ times that of the first case.

If the valve $V_1$ is closed and the valve $V_3$ opened, only the smaller drive motor 24" is fed with pressurized fluid and the larger motor 24' simply recirculates its fluid as did the motor 24" in the previous paragraph. In these positions of the valves $V_1$ and $V_3$, under the same assumptions as in the previous paragraph, only one-third of the torque previously delivered to the wheel drive shaft 26 in the first case is now delivered, but the ratio of wheel speed to engine drive shaft speed is now three times the ratio in the first case. These latter positions of the valves would normally be used, for example, at vehicle cruising speeds.

The coast mode of the transmission is achieved by the closure of both of valves $V_1$ and $V_3$, valves $V_2$ and $V_4$ remaining open for recirculation.

In the braking mode, valves $V_1$ and $V_3$ are closed, but one or both of valves $V_2$ and $V_4$ are likewise closed so as to charge the accumulator 16 with braking energy through line 34. Valves $V_2$ and $V_4$ may be manually controlled but are preferably automatically responsive to an appropriate operating parameter such as the degree of brake pedal force applied by the operator. For example at relatively high vehicle speed only minimal braking would be desired to retain control of the vehicle and prevent skidding. In such case, in response to light brake pedal pressure, valve $V_4$ would be closed to charge the accumulator with the smaller pump-motor 24" while valve $V_2$ is left open to permit pump-motor 24' to recirculate. At higher brake pedal pressure, where a higher degree of braking can obviously be tolerated, valve $V_4$ would be open while valve $V_2$ is closed, resulting in pump-motor 24' providing twice the braking torque of the pump-motor 24" and twice the storage of braking energy assuming the same distance of travel during braking. Where a maximum degree of braking is indicated, both valves $V_2$ and $V_4$ would be closed resulting in three times the braking torque of pump-motor 24" and three times the storage of braking energy.

The foregoing explanation of operating conditions of the transmission is summarized for convenience in the following table:

| Condition | Valves C = closed O = open | | | |
|---|---|---|---|---|
| | $V_1$ | $V_2$ | $V_3$ | $V_4$ |
| Maximum acceleration | O | O | O | O |
| Intermediate acceleration | O | O | C | O |
| Minimum acceleration | C | O | O | O |
| Coast | C | O | C | O |
| Minimum braking | C | O | C | C |
| Intermediate braking | C | O | C | O |
| Maximum braking | C | C | C | C |

The above example illustrates a three-speed transmission utilizing two fixed displacement pump-motors of differing volumetric and torque capacity. Three fixed displacement pump-motors of different volumetric and torque capacity, with comparable valving, would result in a seven-speed transmission, and so forth. Moreover it is not vital that the various multiple fixed displacement pump-motors be mechanically coupled to the same wheel or wheels of a vehicle, but can be coupled to different sets of wheels.

With the utilization of multiple fixed displacement pump-motors, and with the aforedescribed proper type of control valving, an extremely efficient multi-speed, multi-torque hydraulic transmission can be utilized with a hydraulic braking energy storage and conversion system without suffering any of the severe efficiency drawbacks normally associated with variable speed, variable torque hydraulic transmission systems, since all variable displacement mechanisms, primarily responsibe for inefficiency, are eliminated.

The terms and expressions which have been employed in the foregoing abstract and specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. In a wheeled vehicle, a hydraulic multi-speed, multi-torque transmission system for selectively storing energy normally lost in braking the vehicle and releasing the stored energy to aid in accelerating the vehicle, said system comprising:
    (a) an accumulator for hydraulically pressurizing a compressible gas and storing hydraulic fluid under the pressure of said gas;
    (b) hydraulic pump means mechanically coupled to the wheels of said vehicle for being driven by said wheels, said pump means having an inlet and an outlet, the outlet of said pump means being selectively hydraulically connected to said accumulator for pumping hydraulic fluid into said accumulator to pressurize said gas in response to the driving of said pump means by said wheels to brake said vehicle;
    (c) hydraulic motor means mechanically coupled to the wheels of said vehicle for driving said wheels, said motor means having an inlet and an outlet, the inlet of said motor means being selectively hydraulically connected to said accumulator for receiving hydraulic fluid under pressure therefrom, said motor means comprising a plurality of fixed displacement hydraulic motors mechanically coupled to said vehicle wheels;
    (d) an engine mounted on said vehicle;
    (e) fixed displacement hydraulic pump means driven by said engine, said fixed displacement pump means having an inlet and an outlet, said outlet being connected to the inlet of said hydraulic motor means for supplying hydraulic fluid under pressure to said motor means; and
    (f) selectively operable valve means interposed between the inlet of said motor means and the outlet of said engine-driven fixed displacement pump means for selectively directing the flow of hydraulic fluid under pressure from said fixed displacement pump means alternatively to any one or more of said plurality of fixed displacement hydraulic motors.

2. The vehicle of claim 1 wheein said plurality of fixed displacement motors have differing volumetric and torque capacities.

3. The vehicle of claim 1 wherein said valve means is also interposed between the inlet of said motor means and said accumulator, said valve means including means for selectively directing the flow of hydraulic fluid under pressure from said accumulator to the same motor or motors being supplied by said fixed displacement pump means.

4. The vehicle of claim 1 wherein said hydraulic pump means (b) and said hydraulic motor means (c) comprise a plurality of fixed displacement hydraulic pump-motors capable of operating selectively as either pumps or motors, further including second selectively operable valve means for directing hydraulic fluid from the outlets of said pump-motors to said accumulator in response to the braking of said vehicle.

5. The vehicle of claim 4 wherein said second valve means includes means for selectively directing the flow of hydraulic fluid to said accumulator alternatively from the outlet of any one or more of said plurality of fixed displacement hydraulic pump-motors.

6. The vehicle of claim 1 wherein said hydraulic pump means (b) comprises a plurality of fixed displacement hydraulic pumps, further including second selectively operable valve means for directing hydraulic fluid from the outlets of said plurality of pumps to said accumulator in response to the braking of said vehicle.

7. The vehicle of claim 6 wherein said second valve means includes means for selectively directing the flow of hydraulic fluid to said accumulator alternatively from the outlet of any one or more of said plurality of fixed displacement hydraulic pumps.

8. In a wheeled vehicle, a hydaulic multi-speed, multi-torque transmission system for selectively storing energy normally lost in braking the vehicle and releasing the stored energy to aid in accelerating the vehicle, said system comprising:
    (a) an accumulator for hydraulically pressurizing a compressible gas and storing hydraulic fluid under the pressure of said gas;
    (b) hydraulic pump means mechanically coupled to the wheels of said vehicle for being driven by said wheels, said pump means having an inlet and an outlet, the outlet of said pump means being selectively hydraulically connected to said accumulator for pumping hydraulic fluid into said accumulator to pressurize said gas in response to the driving of said pump means by said wheels to brake said vehicle, said pump means comprising a plurality of fixed displacement hydraulic pumps mechanically coupled to said vehicle wheels; and
    (c) selectively operable valve means hydraulically connected to the outlet of said pump means for directing hydraulic fluid to said accumulator alternatively from the outlet of any one or more of said plurality of fixed displacement hydraulic pumps.

* * * * *

UNITED STATES PATENT AND TRADEMARK OFFICE
CERTIFICATE OF CORRECTION

PATENT NO. : 4,098,083
DATED : July 4, 1978
INVENTOR(S) : Vincent E. Carman

It is certified that error appears in the above-identified patent and that said Letters Patent are hereby corrected as shown below:

Col. 3, line 14 Change "utiizes" to --utilizes--.

Col. 6, line 6 Change "wheein" to --wherein--;

line 41 Change "hydaulic" to --hydraulic--.

Signed and Sealed this

Tenth Day of April 1979

[SEAL]

Attest:

RUTH C. MASON
Attesting Officer

DONALD W. BANNER
Commissioner of Patents and Trademarks